(12) United States Patent
Fuller et al.

(10) Patent No.: US 8,384,328 B2
(45) Date of Patent: Feb. 26, 2013

(54) CONTROL METHODOLOGY FOR AN AC STARTER-GENERATOR SYSTEM

(75) Inventors: Randy Fuller, Hillsburgh (CA); Ray McGinley, Fountain Hills, AZ (US); David Chandu-Lall, Georgetown (CA)

(73) Assignee: Honeywell International Inc., Morristown, NJ (US)

( * ) Notice: Subject to any disclaimer, the term of this patent is extended or adjusted under 35 U.S.C. 154(b) by 475 days.

(21) Appl. No.: 12/720,882

(22) Filed: Mar. 10, 2010

(65) Prior Publication Data

US 2011/0042969 A1 Feb. 24, 2011

Related U.S. Application Data

(60) Provisional application No. 61/235,837, filed on Aug. 21, 2009.

(51) Int. Cl.
*H02P 7/00* (2006.01)

(52) U.S. Cl. ..... 318/432; 318/471; 318/472; 123/179.1; 123/179.3; 123/179.5; 123/179.6

(58) Field of Classification Search .......... 318/432, 318/471, 472, 769, 801, 803, 806; 123/179.5, 123/179.16, 179.1, 179.3, 179.6, 179.13, 123/179.14, 179.15, 179.24, 339.24, 406.76, 123/464, 568.31; 73/23.25, 54.16; 417/10
See application file for complete search history.

(56) References Cited

U.S. PATENT DOCUMENTS

| 7,448,220 | B2 | 11/2008 | Schmidt et al. | |
|---|---|---|---|---|
| 8,052,066 | B2 * | 11/2011 | Watanabe et al. | 237/12.3 B |
| 2007/0204827 | A1 * | 9/2007 | Kishibata et al. | 123/179.5 |
| 2008/0054646 | A1 | 3/2008 | Reynolds et al. | |
| 2009/0120701 | A1 * | 5/2009 | Taguchi et al. | 180/65.285 |

FOREIGN PATENT DOCUMENTS

EP 623741 6/2001

* cited by examiner

*Primary Examiner* — Antony M Paul
(74) *Attorney, Agent, or Firm* — Shimokaji & Assoc., PC

(57) ABSTRACT

An aircraft engine starting system may comprise a starter motor, a start controller for controlling the starter motor to operate with a desired torque output, and a processor for determining torque profiles for the starter motor. The processor may provide an initial torque profile responsively to ambient condition of the engine. The processor may also provide modifications to the initial torque profile responsively to temperature of the start controller.

18 Claims, 6 Drawing Sheets

US 8,384,328 B2

CONTROL METHODOLOGY FOR AN AC STARTER-GENERATOR SYSTEM

CROSS-REFERENCE TO RELATED APPLICATIONS

This application claims the benefit of U.S. Provisional Application No. 61/235,837 filed Aug. 21, 2009.

BACKGROUND OF THE INVENTION

The present invention generally relates to electronically controlled aircraft starter-generator systems, and more particularly starter-generator systems that may be employed under widely varying environmental conditions.

Modern aircraft are designed with electronically controlled engine start systems which use power converters to regulate the power delivered to a start motor. When the engine has been exposed to cold ambient temperature, the viscous drag caused by cold engine gearbox oil increases the amplitude of starting torque which must be supplied to reasonably accelerate the engine through light-off. Conversely when the engine temperature is moderate or hot, the required amplitude of starting torque which must be supplied is lower.

The electrical power supplied to the start motor may be converted and controlled by one or more power converters to produce a desired torque profile (i.e., torque vs. rotational speed of the engine). The torque profile must be suitable to successfully start cold soaked engines, as well as engines in high temperature ambient conditions. This means that the power converters must be thermally designed to provide the maximum starting torque even when the engine ambient conditions are such that the engine could be started with much lower starting torque.

The power converters may include high power electronic devices which experience a temperature rise at a rate that is a function of starting power applied to an engine. The junction temperature of the power electronic devices must be carefully managed in order to achieve acceptable power converter reliability. Typically, temperature rise of the device junction may be mitigated by incorporating fans and/or large heat sinks in the start controller. In some cases, a start controller may be constructed with oversized power electronic devices which do not heat rapidly or which may tolerate high temperature.

It can be seen that there exists a need for such a starting system that can successfully operate in both hot and cold ambient conditions. Furthermore there is a need for an engine starting system that may employ a start controller that does not require fans, large heat sinks or oversized power electronic devices.

SUMMARY OF THE INVENTION

In one aspect of the present invention, an engine starting system may comprise a starter motor; a start controller for controlling the starter motor to operate with a desired torque output; a processor for determining torque profiles for the starter motor; wherein the processor provides an initial torque profile responsively to ambient condition of the engine; and wherein the processor provides modifications to the initial torque profile responsively to temperature of the start controller.

In another aspect of the present invention, a controller for an engine starter motor may comprise a converter for converting DC power to AC power; a processor for determining a torque profile that the controller applies to the starter motor; wherein the processor provides an initial torque profile for application to the start motor responsively to engine ambient conditions; and wherein the processor modifies the initial torque profile during a start cycle responsively to temperature of the controller.

In still another aspect of the present invention, a method for starting an aircraft engine may comprise the steps of acquiring data relating to ambient conditions of the engine; producing an initial torque profile responsively to the data relating to ambient conditions of the engine; operating a controller to apply the initial torque profile to a starter motor; driving the starter motor in accordance with the initial torque profile to initiate a start cycle and to impart rotation of the engine; acquiring data relating to temperature of the controller during the start cycle; and modifying the initial torque profile responsively to the acquired data relating to temperature of the controller to limit temperature rise in the controller.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention may generally provide start control systems which apply programmed starting torque (scheduled as a function of speed) at an amplitude that exceeds closely matches the viscous drag torque conditions that may exist prior to when the engine is started. An initial programmed starting torque may be determined, for example, by measuring the engine oil temperature, inlet temperature, and inlet pressure, and then applying a scalar to determine the initial programmed starting torque. As engine rotational speed increases, this scalar may increase or decrease throughout the start cycle as a function of controller temperature. Thus the controller power may be optimized for the prevailing conditions so that the controller heat dissipation is no greater than necessary. Since the thermal management of the controller is most challenging at elevated ambient temperatures, reduction of output power at these conditions may relax the thermal design requirements for the controller. Reduced starting power at elevated ambient temperature may result in improved converter reliability, cost, and weight of the controller.

Figure 1:
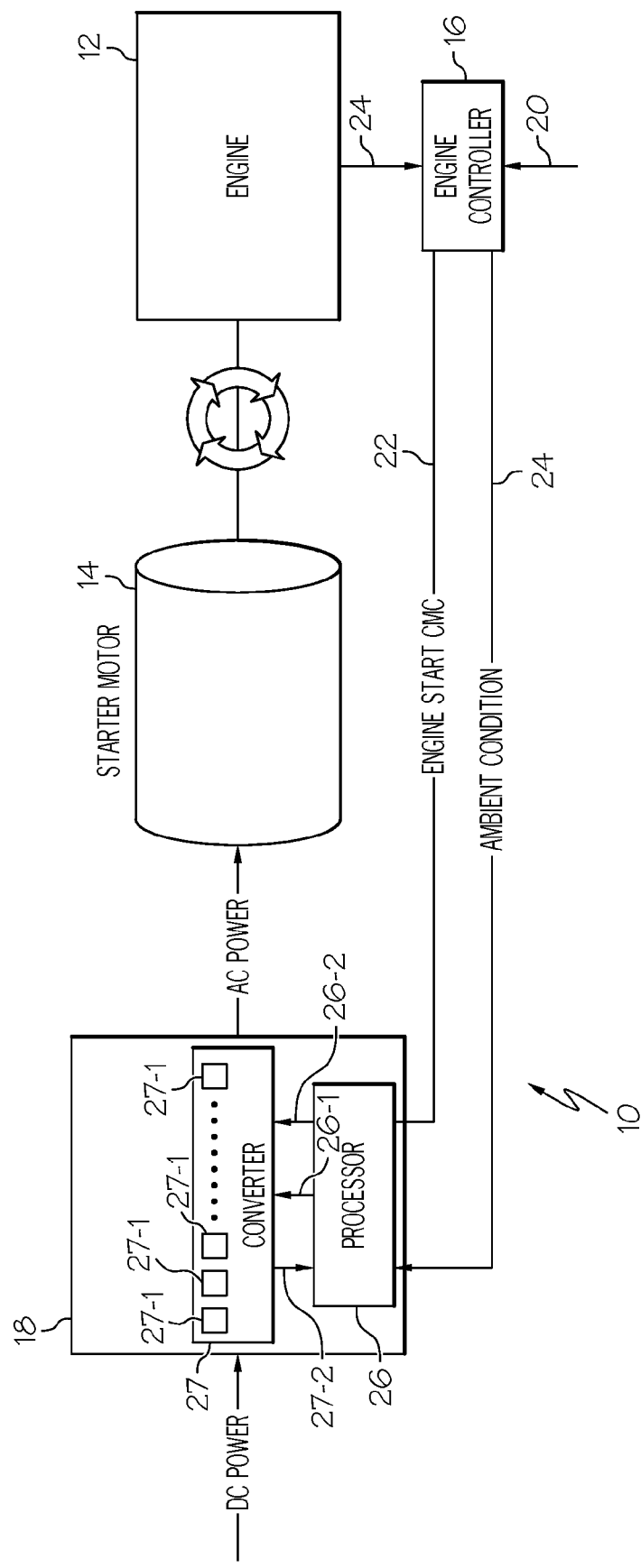
FIG. 1 is a block diagram of an aircraft engine starting system in accordance with an embodiment of the invention.

Referring now to FIG. 1, a starter system 10 for an aircraft engine 12 may comprise a starter/generator or starter motor 14, an engine controller 16 and a start controller 18. The start controller 18 may include a power converter 27 for converting direct current (DC) power to regulated alternating current (AC) power. The power converter 27 may include solid-state power electronic devices 27-1. In operation, the engine controller 16 may receive an externally generated signal 20 to start the engine 12 (e.g. a command from a flight deck of an aircraft). The engine controller 16 may then produce a start command signal 22 to the start controller 18. The engine controller 16 may also be provided with a signal 24 that may represent an ambient condition of the engine 12. The engine controller 16 may transmit the ambient condition signal 24 to the start controller 18. It should be noted that the term ambient condition signal 24 as used herein may represent a collection of various ambient conditions within the engine 12. For example the signal 24 may comprise data relating to engine oil temperature, inlet temperature and inlet pressure.

Figure 2:
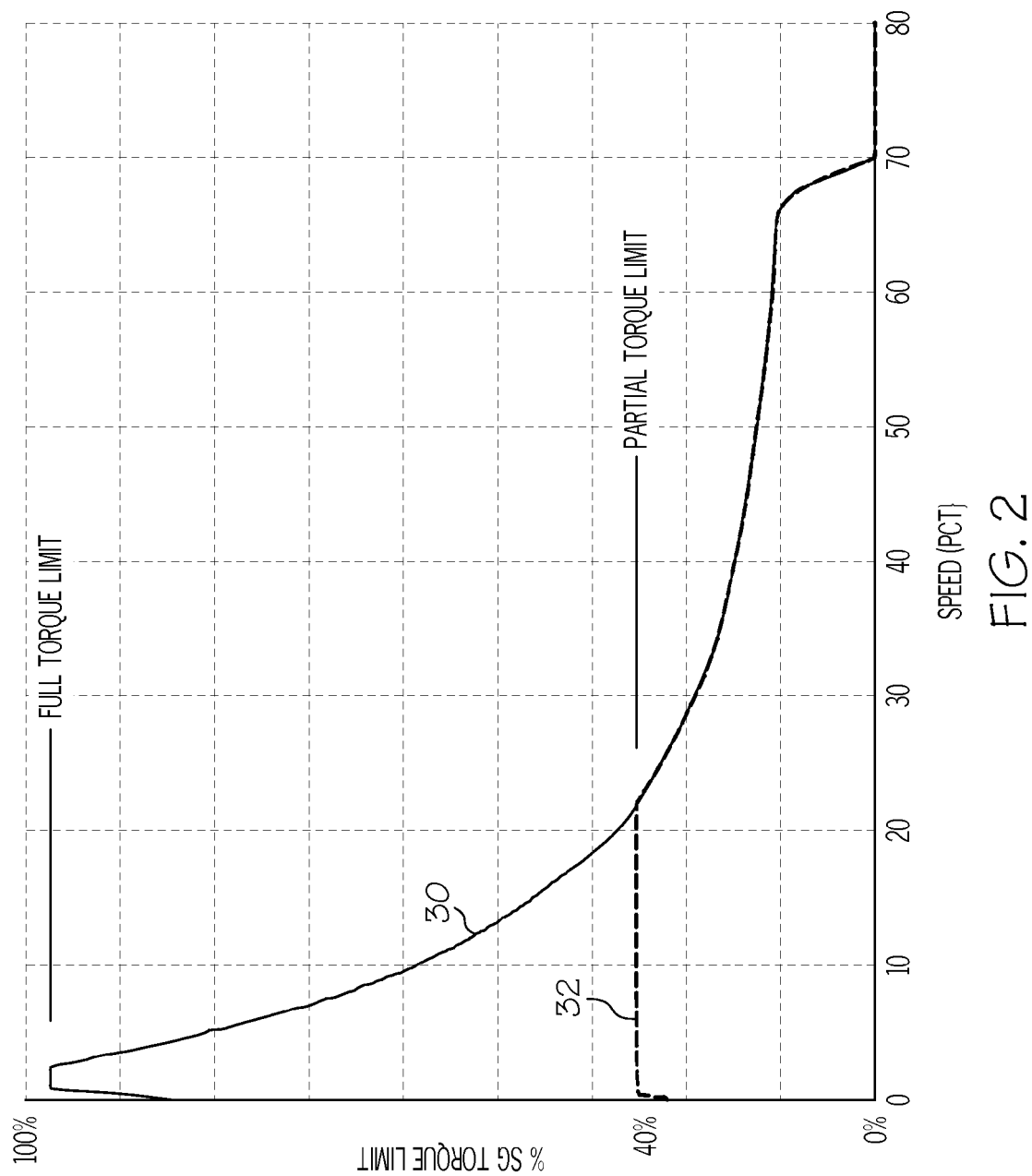
FIG. 2 is graph showing two comparative torque profiles in accordance with an embodiment of the invention.

The start controller 18 may act responsively to the signals 22 and 24 and employ a processor 26 to generate an initial scalar 26-1 that defines an initial profile of a relationship between torque and engine rotational speed (hereinafter referred to a torque profile). Examples of torque profiles are shown in FIG. 2. A first exemplary torque profile 30 may be employed on a normal or cold day (e.g. ambient temperature less than 0° C.). The torque profile 30 may define that the starter motor 14 may initially apply torque at about 100% of its Full Torque Limit. As the engine speed increases, the torque may decrease. When the engine 12 reaches about 70% of its start speed, power may be removed from the starter motor 14 and the engine 12 may complete the start on its own.

A second exemplary torque profile 32 may be employed on a hot day (e.g., ambient temperature greater than about 0° C.) The torque profile 32 may define that the starter motor 14 should apply torque at a Partial Torque Limit which may be about 40% of its Full Torque Limit. As engine speed increases, the torque may decrease. When the engine 12 reaches about 70% of its start speed, the power may be removed from the starter motor 14 and the engine 12 may complete the start on its own.

Figure 3:
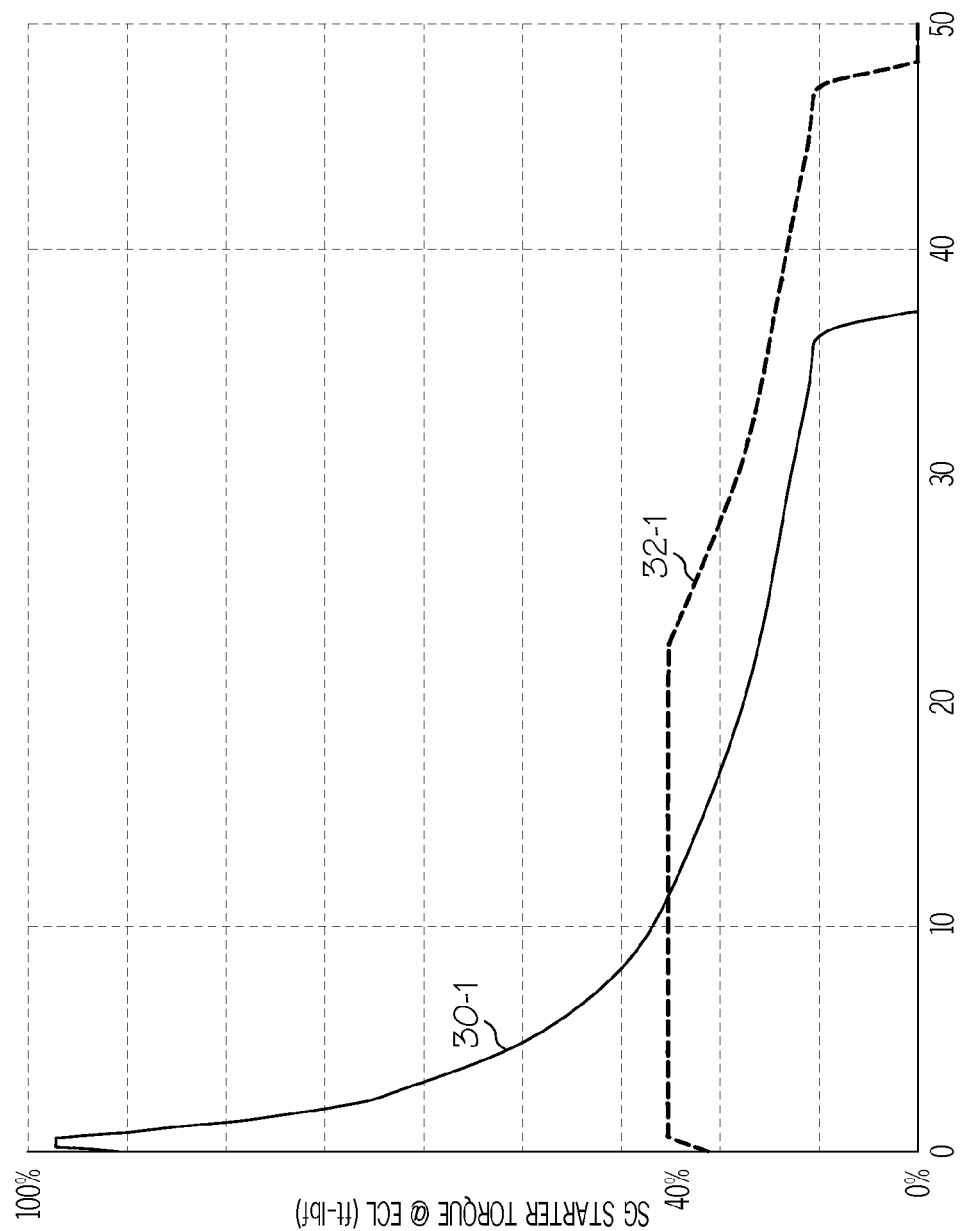
FIG. 3 is a graph showing comparative power curves in accordance with an embodiment of the invention.

Referring now to FIG. 3, it may be seen the starter motor 14 may consume varying amounts of power depending on the shape of the torque profiles. For example, a first power curve 30-1 may correspond to the torque profile 30 of FIG. 2. The power curve 30-1 shows a relationship between torque applied by the starter motor 14 and a period of time during which the torque may be applied. The power curve 30-1 may be employed on a normal or cold day. It may be seen that in the case of the power curve 30-1 that starter motor power can be removed after about 37 seconds (sec.) because the engine 12 can complete start on its own. By comparison, on a hot day a second power curve 32-1 may develop during application of torque lower than that of 30-1 and for a longer period of time than that of 30-1. Overall energy consumption from the starter motor 14 may be lower on a hot day than the energy consumption on a cold or normal day. This may be so even though a starting cycle on a hot day may be longer than a starting cycle on a cold or normal day. In this context, the converter 27 may convert less power on a hot day than on a cool day. The temperature of the converter 27 may be a function of an initial temperature resulting from ambient conditions plus a temperature rise resulting from power conversion activity. It may be seen that the controller 18 may be operated without a cooling fan or large heat sinks (not shown), if a sum of temperature rise and initial ambient temperature does not exceed a predetermined design limit.

Figure 4:
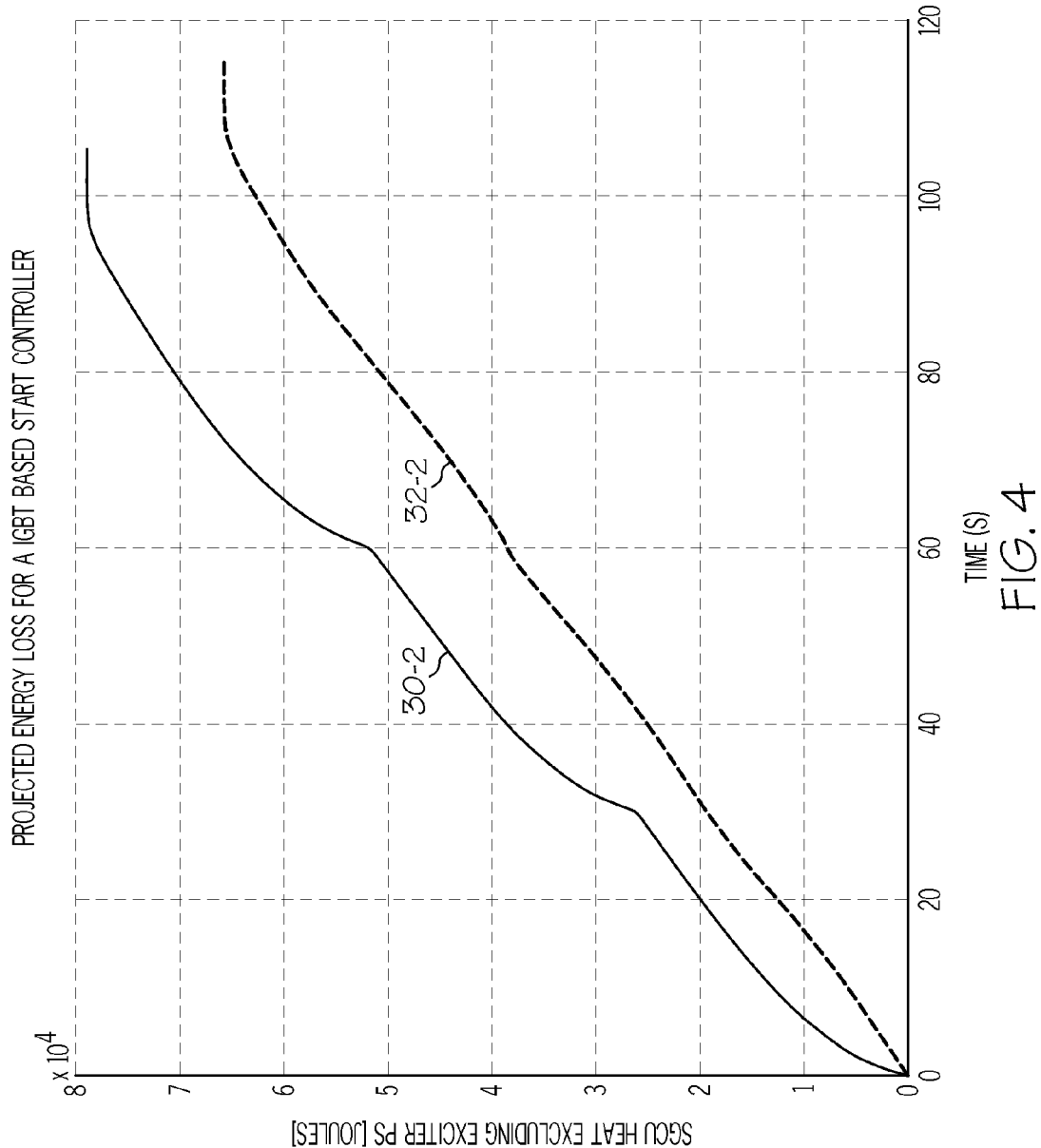
FIG. 4 is a graph showing comparative power dissipation curves in accordance with an embodiment of the invention.

Referring now to FIG. 4, it may be seen how the process of configuring torque profiles may control and limit temperature rise within the power electronic devices 27-1 (e.g. Insulated Gate Bipolar Transistors [IGBT's]) in the converter 27. A first energy dissipation curve 30-2 may correspond to the curves 30 and 30-1 of FIGS. 2 and 3 respectively. The power dissipation curve 30-2 shows that power dissipation rates of about 1000 joules per second (J/sec) to about 1500 J/sec may occur during a starting cycle which may be performed with the torque profile 30 of FIG. 2. When the start controller 18 is in a cool ambient setting, these power dissipation rates may be tolerated without excessive temperature increases in the power electronic devices 27-1. On the other hand, if these same power dissipation rates were to occur in hot ambient conditions, the power electronic devices 27-1 may experience temperature rises that could adversely affect their performance and reliability.

A second energy dissipation curve 32-2 may correspond to the curves 32 and 32-1 of FIGS. 2 and 3 respectively. The energy dissipation rates for the curve 32-2 may range from about 400 J/sec to about 600 J/sec. As reflected by comparing the curves 30-2 and 32-2, the overall energy dissipated by the start controller 18 when operated with the torque profile 32 may be about 14% less than the energy dissipated by operation with the torque profile 30. This reduced energy consumption may result in lower junction temperatures of the power electronic devices 27-1.

A key factor in reducing energy dissipation may relate to reducing current drawn by the starter motor 14. This may be understood when considering that power converter loss (which may result in temperature rise) is determined in accordance with the expression:

$$\text{Power Converter Loss} = K_0 + K_1 i + K_2 i^2$$

$K_0$=power dissipation of control electronics (tends to be small, about 20-30 watts);

$K_1$=Inverter bridge static losses arising from device saturation;

$K_2$=copper losses of magnetic components, inverter bridge losses, increase rise and fall times in switching losses; and i=current to starter motor As seen by the Power Converter Loss calculation, it may be advantageous to reduce the current due to the $i^2$ loss component. Use of an IGBT based controller may be more advantageous than a controller based on MOSFET's because $i^2$ energy consumption is more dominant in a MOSFET based controller than in an IGBT based controller.

Referring back to FIG. 1, it may be noted that processor 26 of the start controller 18 may receive temperature data signals 27-2 from the converter 27. In response to the signals 27-2, the processor 26 may produce a scalar adjustment signal 26-2 which may be employed by the start controller 18 to increase or decrease torque of the starter motor 14. If the converter 27 is not too hot, then torque may be increased and starting may proceed more quickly. If converter too hot, or if its temperature rise rate is too high, then the torque may be decreased so that the temperature of the converter 27 may be maintained in a desired operating range.

Figure 5:
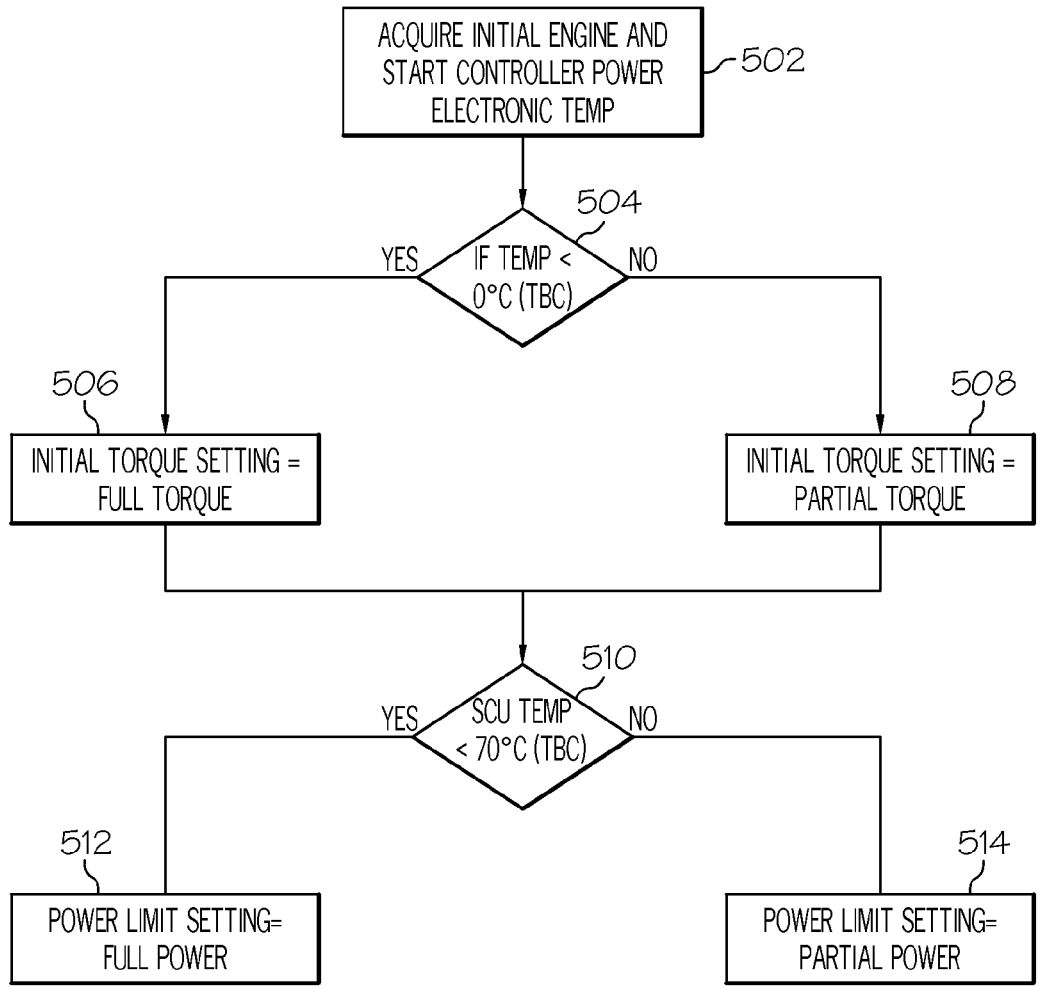
FIG. 5 is a flow chart of a method for starting an aircraft engine in accordance with an embodiment of the invention.

Referring now to FIG. 5, a flow chart 500 may illustrate an exemplary method which may be employed to operate the starter control system 10 in accordance with an embodiment the invention. In a step 502, data relating to ambient conditions and initial engine data may be acquired (e.g., the engine controller 16 may acquire the ambient condition signal 24 and transmit the signal 24 to the start controller 18). In a step 504, the ambient condition signal may be compared to a predetermined parameter (e.g., the signal may be compared to a temperature parameter to determine if temperature is below 0° C.). In step 506 and 508 initial torque settings may be determined (e.g., if temperature is less than 0° C. then the Full Torque Limit (100%) may be set for initial use and if temperature is greater than 0° C. then the Partial Torque Limit (40%) may be set for initial use). In a step 510, temperature of power electronic devices may be determined (e.g., the temperature of controller 18 or the converter 27 may be determined). In steps 512 and 514, power limits may be set (e.g., the processor 26 may provide a scalar adjustment signal 26-2 to the start controller 18 to increase or decrease torque to the starter motor 14 depending on whether the temperature of the devices 27-1 are below or above a predetermined temperature such as 70° C.)

Figure 6:
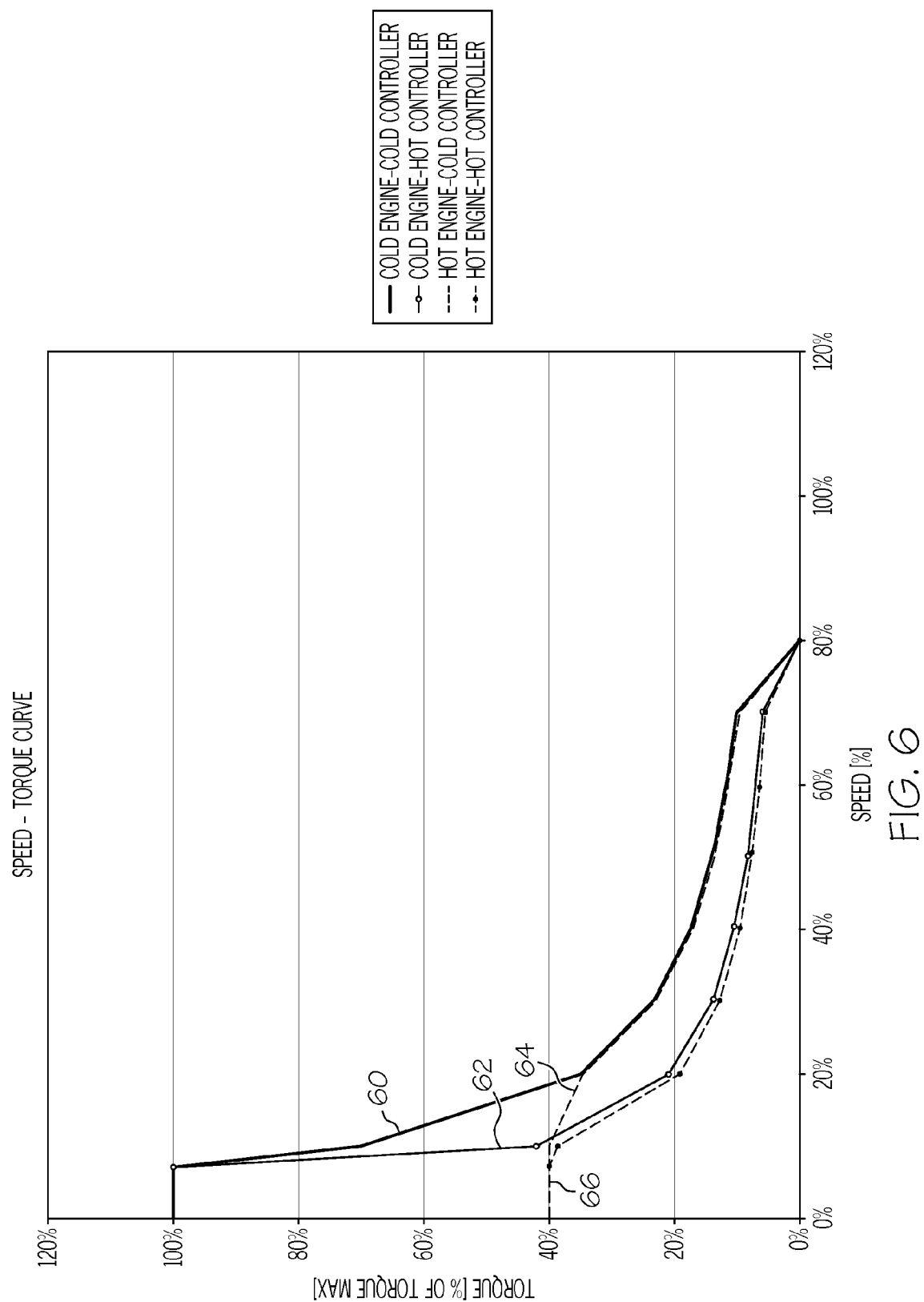
FIG. 6 is graph showing four comparative torque profiles in accordance with an embodiment of the invention.

Referring now to FIG. 6, a set of exemplary torque profiles may illustrate how torque produced by the starter motor 14 of FIG. 1 may vary as a function of ambient conditions and temperature of the devices 27-1 in the controller 18. Torque profile 60 may represent a condition of a cold engine and a cold controller. Torque profile 62 may represent a condition of a cold engine and a hot controller. Torque profile 64 may represent a condition of a hot engine and a cold controller. Torque profile 66 may represent a condition of a hot engine and a hot controller.

It should be understood, of course, that the foregoing relates to exemplary embodiments of the invention and that modifications may be made without departing from the spirit and scope of the invention as set forth in the following claims.

We claim:

1. An engine starting system comprising:

a starter motor;

a start controller for controlling the starter motor to operate with a desired torque output; and a processor for determining torque profiles for the starter motor;

wherein the processor provides to the start controller an initial torque profile responsively to ambient condition of the engine;

wherein the processor provides to the start controller modifications to the initial torque profile responsively to temperature of the start controller; and wherein the start controller applies a reduced torque profile to the starter motor so that the start controller dissipates less power than that dissipated with the initial torque profile whenever internal temperature of the start controller equals or exceeds a predetermined temperature.

2. The starting system of claim 1 wherein the converter comprises at least one solid state electronic power device.

3. The starting system of claim 1 wherein the starter motor produces torque at its Full Torque Limit during at least a portion of a starting cycle when oil temperature in the engine is less than about 0° C.

4. The starting system of claim 1 wherein the starter motor produces torque at its Partial Torque Limit during a starting cycle when oil temperature in the engine is greater than about 0° C.

5. The starting system of claim 1 wherein the start controller applies a reduced torque profile to the starter motor so that the starter motor dissipates less power than that dissipated with the initial torque profile whenever temperature of the start controller equals or exceeds about 70°C.

6. A controller for an engine starter motor comprising:

a converter for converting direct current (DC) power to alternating current (AC) power for the starter motor;

a processor for determining a torque profile that the controller applies to the starter motor;

wherein the processor provides an initial torque profile for application to the starter motor responsively to engine ambient conditions;

wherein the processor receives a temperature data signal from the converter; and wherein the processor produces a scalar adjustment signal to the converter to modify the initial torque profile during a start cycle responsively to the temperature of the converter.

7. The controller of claim 6:

wherein the controller delivers a first amount of power to the starter motor during a start cycle when ambient temperature of the engine is less than a predetermined temperature;

wherein the controller delivers a second amount of power to the starting motor during a start cycle when ambient temperature of the engine is greater than the predetermined temperature; and wherein the first amount of power is greater than the second amount of power.

8. The controller of claim 7 wherein the first amount of energy exceeds the second amount of energy by at least about 14%.

9. The controller of claim 6 wherein the processor reduces the initial torque profile during a start cycle responsively to temperature of the converter being equal to or exceeding 70° C.

10. The controller of claim 6 wherein the processor reduces the initial torque profile during a start cycle responsively to a predetermined temperature of the converter.

11. The controller of claim 6 wherein the processor defines the initial torque profile with no more than its Partial Torque Limit of the starter motor when oil temperature in the engine is greater than 0° C.

12. The controller of claim 6 wherein no cooling fan is present in the controller.

13. A method for starting an aircraft engine comprising the steps of:

acquiring data relating to ambient conditions of the engine;

producing an initial torque profile responsively to the data relating to ambient conditions of the engine;

operating a controller to apply the initial torque profile to a starter motor;

driving the starter motor in accordance with the initial torque profile to initiate a start cycle and to impart rotation of the engine;

acquiring data relating to temperature of the controller during the start cycle; and modifying the initial torque profile responsively to the acquired data relating to temperature of the controller to limit temperature rise in the controller.

14. The method of claim 13 wherein the step of operating a controller further comprises the steps of:

converting DC power to AC power;

applying the AC power to the starter motor; and controlling torque output of the starter motor during the start cycle.

15. The method of claim 13 wherein the application of the initial torque profile to the starter motor results in operation of the starter motor at its Full Torque Limit during at least a portion of the start cycle when ambient temperature of the engine is equal to or less than 0° C.

16. The method of claim 13 wherein the application of the initial torque profile to the starter motor results in operation of the starter motor at no more than its Partial Torque Limit during the start cycle when ambient temperature of the engine is equal to or greater than 0° C.

17. The method of claim 13 wherein step of modifying the initial torque profile comprises producing a torque profile that results in the starter motor dissipating less power than that dissipated with the initial torque profile whenever temperature of the controller equals or exceeds a predetermined temperature.

18. The method of claim 13 wherein the predetermined temperature is about 70° C.

* * * * *